(12) United States Patent
Hung et al.

(10) Patent No.: US 11,366,710 B1
(45) Date of Patent: Jun. 21, 2022

(54) METHODS AND SYSTEMS FOR REDUCING DOWNTIME FROM SYSTEM MANAGEMENT MODE IN A COMPUTER SYSTEM

(71) Applicant: Quanta Computer Inc., Taoyuan (TW)

(72) Inventors: Ming-Hung Hung, Taoyuan (TW); Hsing-Chi Chen, Taoyuan (TW); Yan-Ting Jiang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 6 days.

(21) Appl. No.: 17/183,081

(22) Filed: Feb. 23, 2021

(51) Int. Cl.
    *G06F 11/07*  (2006.01)

(52) U.S. Cl.
    CPC ...... *G06F 11/0724* (2013.01); *G06F 11/0772* (2013.01)

(58) Field of Classification Search
    CPC ............. G06F 11/0721; G06F 11/0724; G06F 11/0772
    See application file for complete search history.

(56) References Cited

U.S. PATENT DOCUMENTS

| | | | | |
|---|---|---|---|---|
| 10,303,501 | B2* | 5/2019 | Ali | G06F 21/575 |
| 2007/0239917 | A1* | 10/2007 | Orita | G06F 13/24 |
| | | | | 710/268 |
| 2010/0281225 | A1 | 11/2010 | Chen et al. | |
| 2016/0328277 | A1 | 11/2016 | Ahmed et al. | |
| 2019/0171505 | A1* | 6/2019 | Nachimuthu | G06F 11/0712 |
| 2021/0406143 | A1* | 12/2021 | Chaiken | G06F 11/277 |

FOREIGN PATENT DOCUMENTS

| | | |
|---|---|---|
| CN | 109933449 A | 6/2019 |
| CN | 110895518 A | 3/2020 |
| CN | 111414268 A | 7/2020 |
| TW | 594466 B | 6/2004 |
| TW | 201730763 A | 9/2017 |

OTHER PUBLICATIONS

TW Office Action for Application No. 110117851, dated Feb. 11, 2022, w/ First Office Action Summary.
TW Search Report for Application No. 110117851, dated Feb. 11, 2022, w/ First Office Action.

* cited by examiner

*Primary Examiner* — Joseph R Kudirka
(74) *Attorney, Agent, or Firm* — Nixon Peabody LLP (57) ABSTRACT

A system and method for shortening the system management mode when a fault occurs in hardware component in a computer system is disclosed. The computer system has hardware components that may have faults. Notification of an error in one of the hardware components is received through RAS silicon on a processing unit. The error is detected from the hardware component by a system management interrupt handler executed by a bootstrap processor core. The error data is logged into a system error log via a system control interrupt handler executed by the processing unit. The system management mode is avoided during the logging of the error data. This prevents other processor cores being suspended from the system management mode.

20 Claims, 9 Drawing Sheets

METHODS AND SYSTEMS FOR REDUCING DOWNTIME FROM SYSTEM MANAGEMENT MODE IN A COMPUTER SYSTEM

TECHNICAL FIELD

The present disclosure relates generally to operating reliability in computer systems. More particularly, aspects of this disclosure relate to a system that transfers error reporting during the system management mode to allow processor cores to remain operational.

BACKGROUND

Servers are employed in large numbers for high demand applications, such as network based systems or data centers. The emergence of cloud computing applications has increased the demand for data centers. Data centers have numerous servers that store data and run applications accessed by remotely connected, computer device users. A typical data center has physical rack structures with attendant power and communication connections. Each rack may hold multiple application servers and storage servers. Each server generally includes hardware components such as processors, memory devices, network interface cards, power supplies, and other specialized hardware. Each of the servers generally includes a baseboard management controller that manages the operation of the server and communicates operational data to a central management station that manages the servers of the rack.

A typical server has a processing unit that may have multiple cores for computing operations. The cores run an operating system to communicate with other hardware components in the server. One of the functions of the operating system is to determine errors that indicate a malfunction of a hardware component. The chip set of the processing unit may also include a south bridge chip that handles input/output functions and a north bridge chip that handles memory operations. Another function of both the north bridge and south bridge chips is to handle different reliability-availability-serviceable (RAS) features through dedicated RAS silicon on the chip. The RAS features are designed to increase reliability, availability and facilitate service of peripheral components in a computing system. The main goals of a RAS feature are to: 1) increase system uptime; 2) reduce the duration of unplanned down time; and 3) maintain data integrity. For example, RAS features detect device errors in accessories such as add-on cards, dual in line memory modules (DIMM)s, and hard disk drives (HDD)s. The RAS features allow the recording of errors for later analysis and for determining whether an operator must replace a hardware component.

The system management mode (SMM) is a well-known special-purpose operating mode provided for handling system-wide functions such as power management or system hardware control in computer systems. The SMM offers a distinct and easily isolatable processor environment that operates transparently to the operating system, or executive and software applications. The processing unit executes the SMM firmware code in a separate address space that is inaccessible to other operating modes of the processing unit. The SMM can only be entered through a system management interrupt (SMI).

The SMI is commonly used in server platforms to handle different RAS features. Typically, the bootstrap processor (BSP) of a computer system performs the SMM. During SMM, the bootstrap processor performs event logging to record the device with a reported error. Once the device is identified, a technician may replace the device. For example, in relation to peripheral component interface express (PCIe) devices, RAS error reporting consists of two functions: error logging; and error signaling. This RAS feature covers reporting of errors that occur on the PCIe interface itself, errors which occur on behalf of transactions initiated on the PCIe component, and errors which occur within a PCIe component and are related to the PCIe interface. Another example of RAS error reporting may be memory specific error features that relate to errors from memory devices such as dual in-line memory modules (DIMMs).

However, when a computer system enters SMM, all processing cores and threads also enter the SMM mode until the bootstrap processor (BSP) finishes the respective SMM RAS service and exits the SMM. While the SMM RAS service is executed, the system service as well as application execution are halted. This means the computer system cannot provide other computing services, which results in down time while waiting for the boot processor to exit the SMM.

Figure 1A:
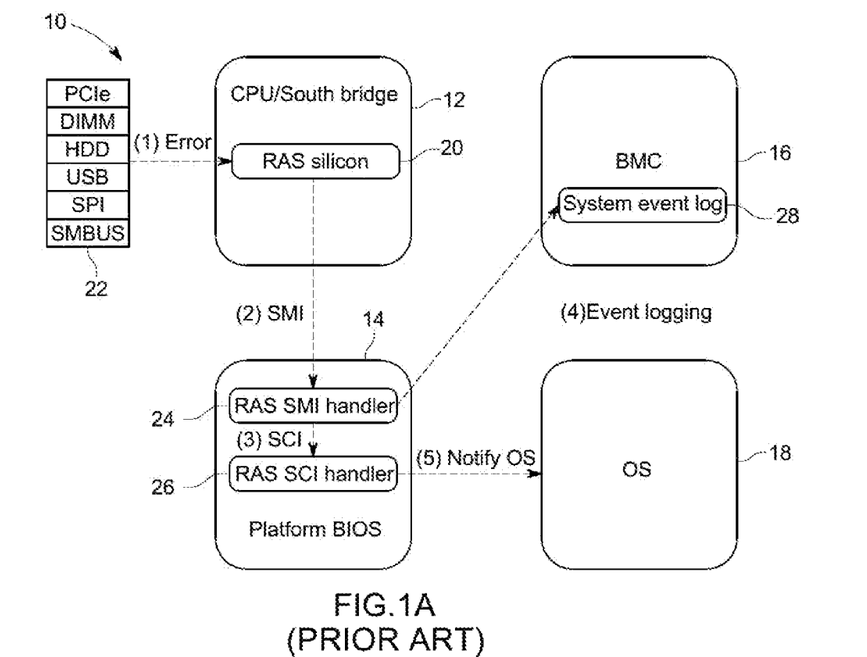
FIG. 1A is a block diagram of a prior art computing system that initiates a RAS service.

FIG. 1A is a block diagram of a prior art computer system 10 that may initiate a RAS service for error detection and logging. The computer system 10 may include a south bridge chip 12 of a processing unit, a platform BIOS 14, a baseboard management controller (BMC) 16, and an operating system 18. The CPU/south bridge 12 performs basic input/output functions for the computer system 10 and includes RAS silicon 20. The RAS silicon 20 monitors different hardware devices 22. The hardware devices 22 in this example include peripheral component interface express (PCIe) devices, dual in line memory modules (DIMM), hard disk drives (HDD), universal serial bus (USB) devices, serial peripheral interface (SPI) devices, and system management bus (SMBUS) devices.

The platform BIOS 14 includes a RAS SMI handler 24, and a RAS system control interrupt (SCI) handler 26. In this example, the RAS SMI handler 24 processes SMM interrupts. The RAS SCI handler 26 processes system control interrupts to provide notification to the operating system 18. When the SMM is activated, the system management interrupt occurs. The RAS SMI handler 24 determines the source of the error and causes error data on the device to be written into a system event log (SEL) 28 in the BMC 16. The process of logging the error data in the SEL 28 takes a relatively long time, and occurs during the SMM. During the SMM, the processing unit (e.g., a CPU) prevents the operating system 18 from performing execution of threads or other operations from processor cores.

Figure 1B:
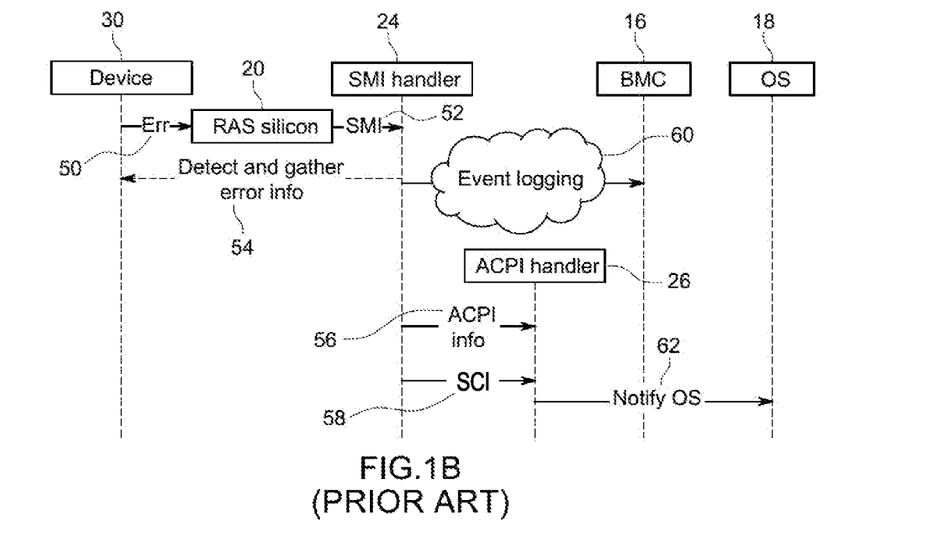
FIG. 1B is a timing diagram of the prior art computer system that illustrates the issue of the SMM preventing other processor operations.

FIG. 1B is a timing diagram of the prior art computer system 10 in FIG. 1A that illustrates the issue of the SMM preventing further operations. A hardware device 30 such as one of the hardware devices 22 in FIG. 1A may malfunction, thus causing an error. The RAS silicon 20 receives an error notification from the hardware device 30 and invokes the SMI handler 24 (50). The RAS silicon 20 thus generates a system management interrupt (SMI) and enters the system management mode (SMM) (52). During the SMM, the SMI handler 24 communicates with the hardware device 30, and detects and gathers information about the error (54). The SMI handler 24 saves the error information in the Advanced Configuration and Power Interface (ACPI) protocol in ACPI memory to the SCI handler 26 (56). The SMI handler 24 initiates a system control interrupt to the SCI handler 26 (58). The SMI handler 24 initiates error logging to write the error information into the system error log 28 of the BMC 16 (60). The SCI handler 26 notifies the operating system 18 of the system control interrupt (62). During the execution of the system management mode (SMM), the operating system 18 cannot execute any threads or any other processing operations.

The RAS features are important for error detection and reporting faulty peripheral components in operation of computing systems such as servers. However, each time the SMI is executed, the entire server must freeze since the operating system suspends all cores to enter the SMM, which causes down time and thus decreases the system performance. Moreover, if the errors from devices on a server are asserted frequently, the errors cause a cascade of SMIs thereby increasing down time. Such a cascade of SMIs may have a large impact on system performance because of the down time.

Thus, there is a need for a system that shortens the effective time of the SMM to reduce down time in a computer system. There is another need for a system that shifts error logging to the system control interrupt handler to shorten the SMM. There is another need for a system that shifts all RAS functions from the system management handler to the system control interrupt handler.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter; nor is it intended to be used in isolation to determine the scope of the claimed subject matter. The subject matter should be understood by reference to appropriate portions of the entire specification of this disclosure, any or all drawings and each claim.

One disclosed example is a computer system having a basic input output system (BIOS) chip and a processor unit. The processor unit has a bootstrap core executing a system management interrupt handler and a system control interrupt handler stored on the BIOS chip. The processor unit includes silicon for receiving error information. A hardware component is coupled to the processor unit. The hardware component sends error information to the silicon. The computer system includes a management controller having a system error log. The management controller is coupled to the processor unit. The bootstrap core executes the system control interrupt handler to avoid a system management mode. The system control interrupt handler logs an error of the hardware component in the system error log.

A further implementation of the example system is an embodiment where the management controller is a baseboard management controller. Another implementation is where the computer system is a server. Another implementation is where the bootstrap core enters the system management mode and executes the interrupt handler to detect the error. The interrupt handler exits the system management mode after error detection. Another implementation is where the hardware component is one of a PCIe device, a dual in line memory module, a hard disk drive, a universal serial bus device, a serial peripheral interface (SPI) device, and system management bus (SMBUS) device. Another implementation is where the processor unit includes a plurality of processor cores including the bootstrap core. Another implementation is where the processor unit includes a south bridge chip including the silicon, and wherein the silicon performs RAS features. Another implementation is where the system control interrupt handler performs the error detection. Another implementation is where the system control interrupt handler is initiated by a signal from a GPIO controller. Another implementation is where the system control interrupt handler is initiated directly from the silicon communicating with the system control interrupt hander.

Another disclosed example is a method of operating a computer system. Notification of an error in a hardware component is received through silicon on a processing unit. The error is detected from the hardware component. Error data is logged into a system error log managed by a management controller via a system control interrupt handler executed by a processor core of the processing unit. A system management mode is avoided during the logging of the error data.

Another implementation of the example method is where the error detection is performed via a system management interrupt handler. The computer system enters into a system management mode during the error detection and exits the system management mode when the error data is logged. Another implementation is where the controller is a baseboard management controller. Another implementation is where the computer system is a server. Another implementation is where the processor core is one of a plurality of processor cores, and the cores are operable to process threads while the error logging occurs. Another implementation is where the hardware component is one of a PCIe device, a dual in line memory module, a hard disk drive, a universal serial bus device, a serial peripheral interface (SPI) device, and system management bus (SMBUS) device. Another implementation is where the processor unit includes a south bridge chip including the silicon, and wherein the silicon performs RAS features. Another implementation is where the error detection is performed via a system control interrupt handler executed by the processor core. Another implementation is where the system control interrupt handler is initiated by a signal from a general purpose input output (GPIO) controller. Another implementation is where the system control interrupt handler is initiated directly from the silicon triggering the system control interrupt hander.

BRIEF DESCRIPTION OF THE DRAWINGS

The disclosure will be better understood from the following description of exemplary embodiments together with reference to the accompanying drawings, in which.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a routine that allows the institution of the system management mode (SMM) for error logging while allowing threads to be executed by processing cores in a computer system. The example routine offloads a high latency SMM service routine for error logging. The offloaded error logging routine includes communications between a system control interrupt (SCI) handler, and the basic input output system (BIOS) and the baseboard management controller (BMC). The handoff of the routine from the SMM may be accomplished because the SCI only requires one thread to execute the Advanced Configuration and Power Interface (ACPI) protocol. Since the communication between the BIOS and the BMC for error logging takes the majority of the time during the SMM, downtime from the SMM for the computer system is reduced significantly when the error logging routine is offloaded to the system control interrupt (SCI) handler.

The routine does not compromise the execution of any RAS services as it offloads some or all RAS services from the SMI handler to the SCI handler. This allows all RAS services to be performed but does not require a long down time. In addition, since the SMM execution is limited in time and size, the boot processor cannot do large scale computations such as error logging rapidly. When the error logging is executed in the SCI handler, the RAS services may be executed more efficiently.

When the RAS silicon detects any error, the computer system triggers a RAS system management interrupt (SMI). The RAS SMI handler in this example only provides the service for error detection during the SMM. Services such as event logging with a high latency period are offloaded to the SCI handler. Therefore, the SMI handler only performs error detection and saves the information into an Advanced Configuration and Power Interface (ACPI) memory. After that, the example routine triggers the SCI handler for error logging. This allows the system to exit the system management interrupt (SMI) and the SMM. After exiting the SMI, the SCI handler executes the rest of the RAS services such as error logging.

The SCI handler identifies whether the error is a RAS General Purpose Event (GPE). If the RAS GPE is present, the SCI handler parses the RAS ACPI memory to identify whether there is any valid information that needs to be logged into the BMC system error log (SEL). Once the error is logged in the SEL, the routine exits the SCI handler.

Figure 2:
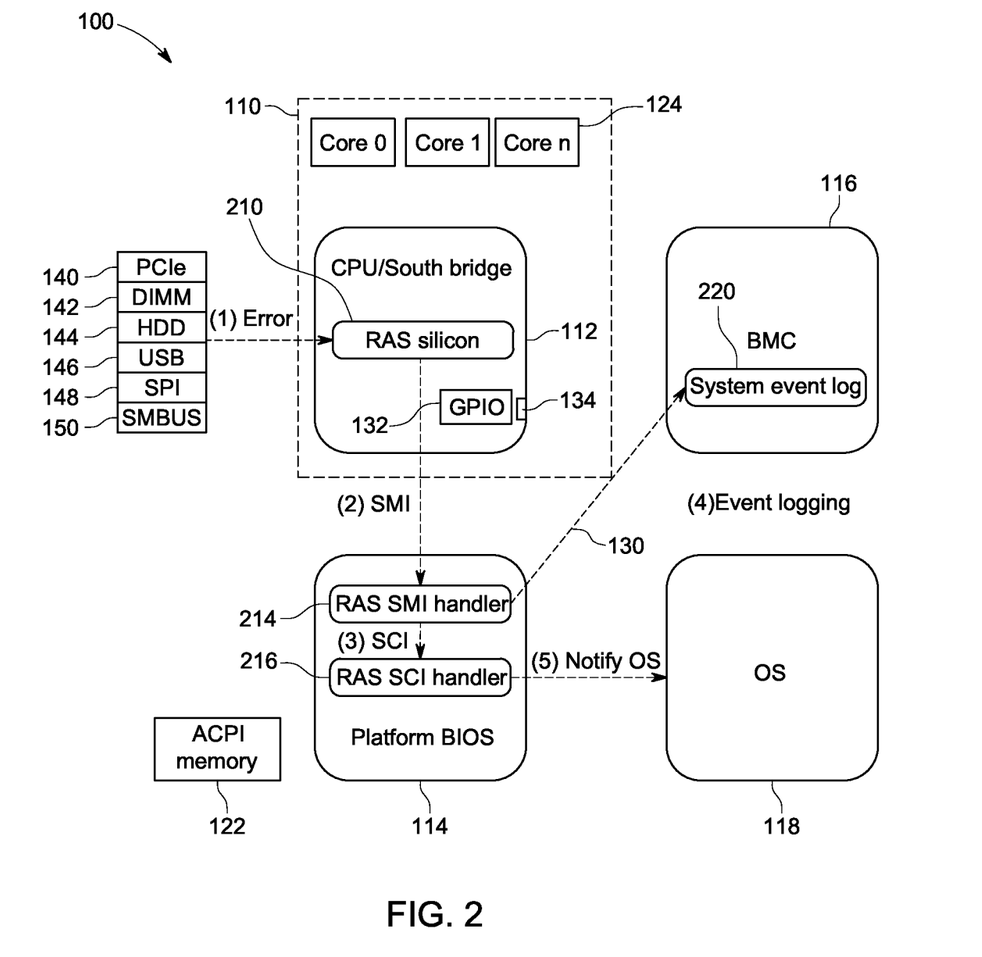
FIG. 2 is a block diagram of the components of a computer system that allows performing of certain SMM features by the system control interrupt handler.

FIG. 2 is a block diagram of a computer system 100 that allows initiation of a RAS service for error reporting using an SCI handler, while allowing operation of threads and other operations. In this example, the computer system 100 is a server, but the principles disclosed herein may be incorporated in any computer system having an operating system with RAS services and using a system management mode (SMM). The computer system 100 includes a central processing unit (CPU) 110 that has a south bridge chip 112, a platform BIOS 114, a baseboard management controller (BMC) 116, and an operating system 118. An ACPI memory 122 may be defined as part of the system memory for the computer system 100. The central processing unit 110 also may include multiple processing cores 124. One of the processing cores 124 may be a boot strap processor that is accessed by the BIOS 114 during the start-up routine.

A bus 130 allows communication between the BMC 116 and the platform BIOS 114. The south bridge chip 112 may have a general purpose input output (GPIO) controller 132 that controls a GPIO input 134. In this example, the GPIO input 134 may be in communication with the RAS silicon as will be explained below. Thus, the RAS silicon may communicate signals to the GPIO input 134 or other GPIO inputs on the processor chip set.

The computer system 100 includes various hardware peripheral devices. The hardware peripheral devices in this example include peripheral component interface express (PCIe) devices 140, dual in line memory modules (DIMM) 142, hard disk drives (HDD) 144, universal serial bus (USB) devices 146, serial peripheral interface (SPI) devices 148, and system management bus (SMBUS) devices 150. The PCIe devices may include expansion cards such as NICs (Network Interface Cards), redundant array of inexpensive disks (RAID) cards, field programmable gate array (FPGA) cards, solid state drive (SSD) cards, dual in-line memory, and graphic processing unit (GPU) cards. It is to be understood that there may be many such devices, and may include different types of devices from the devices described herein.

The south bridge chip 112 performs basic input/output functions for the computer system 100 and includes RAS silicon 210. The RAS silicon 210 is a logical complex that exists both in a processing core and the south bridge chip 112. The RAS silicon 210 monitors reliability, availability, and serviceability for the different hardware peripheral devices. The platform BIOS 114 includes a RAS system management mode interrupt (SMI) handler 214, and a RAS system control interrupt (SCI) handler 216. In this example, the RAS SMI handler 214 processes system management interrupts and performs error detection. In this example, the SCI handler 216 provides notifications to the operating system 118 of entering interrupts such as a system control interrupt (SCI) or a non-maskable interrupt (NMI). In this example, the RAS SMI handler 214 is executed by the bootstrap core while the other cores are suspended from the entry into the SMM. However, the RAS SCI handler 216 is executed by one of the processing cores 124 and the other cores may still be used by the operating system. The BMC 116 includes an internal memory that stores a system event log (SEL) 220. The SEL 220 stores information on detected errors communicated from the BIOS 114.

When a SMM interrupt occurs, the RAS feature of writing error data is performed by the SCI handler 216 instead of the RAS SMI handler 214 as in known systems. The RAS SCI handler 216 performs the RAS feature of writing error data from the faulty device to the system event log (SEL) 220 in the BMC 116. Thus, the system management interrupt and the SMM end after the RAS SMI handler 214 detects the error. After error detection, the RAS SCI handler 216 executes error logging. Since the operating system 118 exits the SMM, the operating system 118 may then perform execution of threads or other operations on the processing cores as they are not suspended from the SMM.

Figure 3:
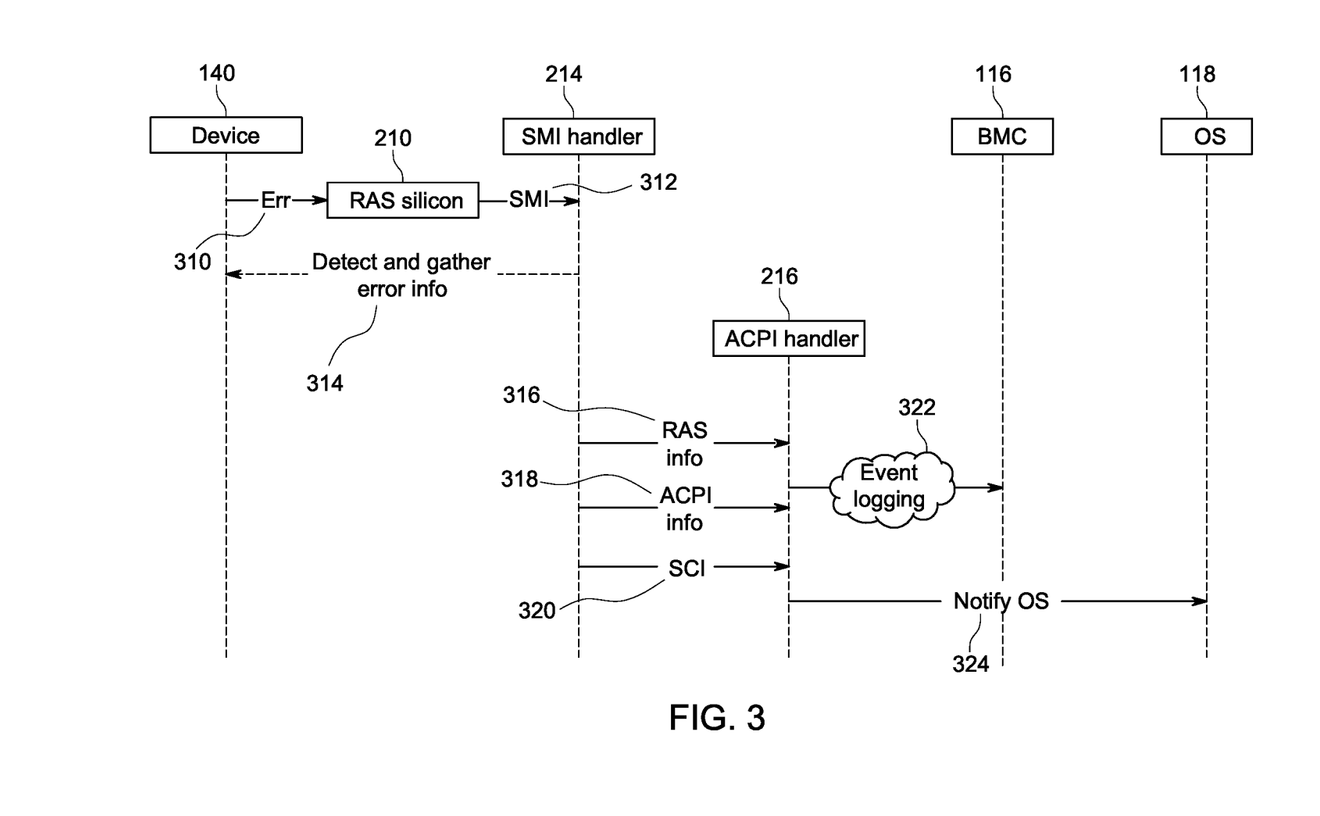
FIG. 3 is a timing diagram of the computer system in FIG. 2 that shows the performance of RAS features by the SCI handler during a SMM according to the example routine.

FIG. 3 is a timing diagram of the example routine for the execution of the system management mode (SMM) on the computer system 100 in FIG. 2. In this example, a hardware device, such as one of the PCIe devices 140, may malfunction thus causing an error (310). The RAS silicon 210 receives an error notification from the device 140 and invokes the SMI handler 214 with a system management interrupt (312). The SMI handler 214 will communicate with the device 140 to detect and gather information about the error (314). The error information is stored in the ACPI memory 122 in FIG. 2. In this example, the RAS SCI handler 216 operates according to ACPI protocol. The SMI hander 214 sends the ACPI information on the error stored on the ACPI memory 122 in FIG. 2 to the RAS SCI handler 216 (318). The RAS SCI handler 216 will thus provide the status information from the RAS silicon 210 and gathered error information for error event logging to the RAS SCI handler 216 (316). The SMI handler 214 initiates a system control interrupt to the RAS SCI handler 216 (320). The RAS SCI handler 216 begins performing event logging by sending the error data to the system event log of the BMC 116 (322). While the RAS SCI handler 216 is performing the error logging operation, the system has already exited the SMM and thus continue other operations. The RAS SCI handler 216 notifies the operating system 118 of the service for the error data stored on the ACPI memory 122 (324).

Figure 4:
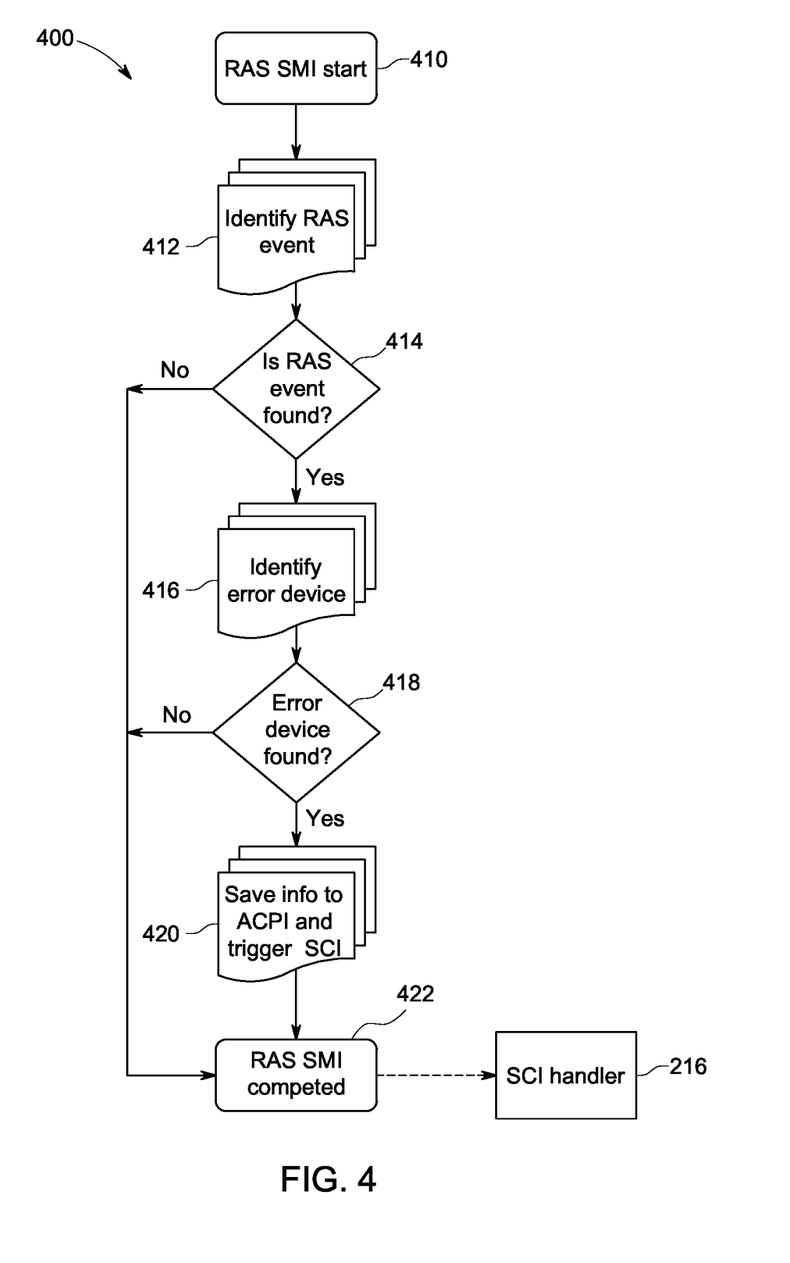
FIG. 4 is a flow diagram of the routine for interrupting and offloading the RAS feature to the SCI handler in FIG. 2.

FIG. 4 is a flow diagram 400 of an example routine for handling an SMM interrupt using the RAS SCI handler 216 to perform the RAS error logging feature in the computer system 100 in FIG. 2. A RAS SMI is received by the RAS SMI handler 214 (410). The RAS SMI handler 214 identifies a RAS event that is a result of a faulty hardware device (412). The RAS SMI handler 214 then determines whether the RAS event is found by cycling through each hardware device (414). When the RAS event is found, the device with an error is identified by the routine (416). The routine then determines if the device with the error has been found (418). If the hardware device with the error is found, the information is saved via the ACPI protocol to the ACPI memory 122, and the RAS SCI handler 216 is initiated (420). The RAS SMI handler 214 then completes its routines, and exits the SMM. The remaining RAS features are transferred to the RAS SCI handler 216. If no RAS event is found (414) or no hardware device with an error is found (418), the system exits the SMM (422).

Figure 5:
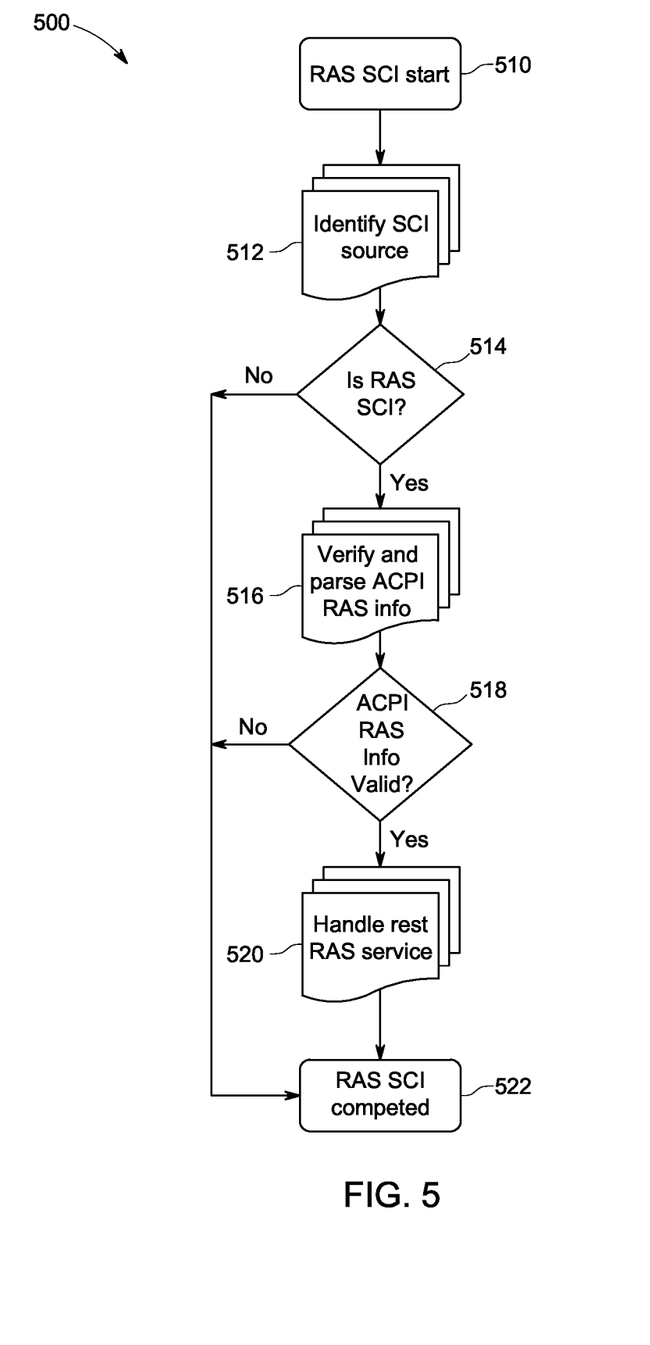
FIG. 5 is a flow diagram of the execution of certain RAS features by the SCI handler in FIG. 2.

If an error has occurred on one of the hardware devices, the RAS error logging features are performed by the RAS SCI handler 216. FIG. 5 is a flow diagram 500 of the execution of the RAS error logging feature by the RAS SCI handler 216. The routine starts the RAS SCI handler 216 (510). The routine then identifies the source of the system interrupt by reading the ACPI memory 122 (512). The routine then determines whether the RAS SCI has been triggered (514). The routine verifies and parses the RAS information received from the RAS SMI handler 214 (516). The routine then determines whether the ACPI RAS information is valid (518). If the information is valid, the handler will handle the RAS service and thus send the error data to the SEL 220 on the BMC 116 (520). The RAS SCI handler 216 will then finish the routine (522). If there is no interrupt (512) or the ACPI RAS information is not valid (518), the routine will also terminate (522).

Downtime may be further decreased by performing all RAS services by the SCI handler 216 in FIG. 2. Since the RAS SMI service is no longer required, much less down time is expected for the computer system 100. There may be two different scenarios for this process of executing all RAS services through the RAS SCI handler 216, an in-band routine and an out of band routine.

In the in-band routine, when the RAS silicon 210 detects errors, it triggers the in-band system control interrupt to signal the RAS SCI handler 216. The RAS SCI handler 216 performs all of the functions originally located in the RAS SMI handler 214 including error detection. Thus, the RAS SCI handler 216 logs the error information to the SEL 220 in the BMC 216. After completing the error logging, the RAS SCI handler 216 exits the RAS service. Thus, all the error detection and logging features performed during SCI are performed without any interruption as the RAS SMI handler 214 is not called.

Alternatively, the RAS silicon 210 may generate a signal on a hardware pin such as a GPIO pin to signal the event. In this example, this signal is sent to the SCI-capable General Purpose Input/Output (GPIO) pin 134 and received by the GPIO controller 132 on the south bridge chip 112. Thus, once the RAS silicon 210 detects an error, it can signal the RAS SCI handler 216 through the GPIO controller 132. The SCI handler 216 acts as an ACPI driver that services the signal first. The ACPI driver identifies whether an RAS General Purpose Event (GPE) has occurred. If a GPE has occurred, the RAS SCI handler 216 handles all the RAS services accordingly.

Figure 6:
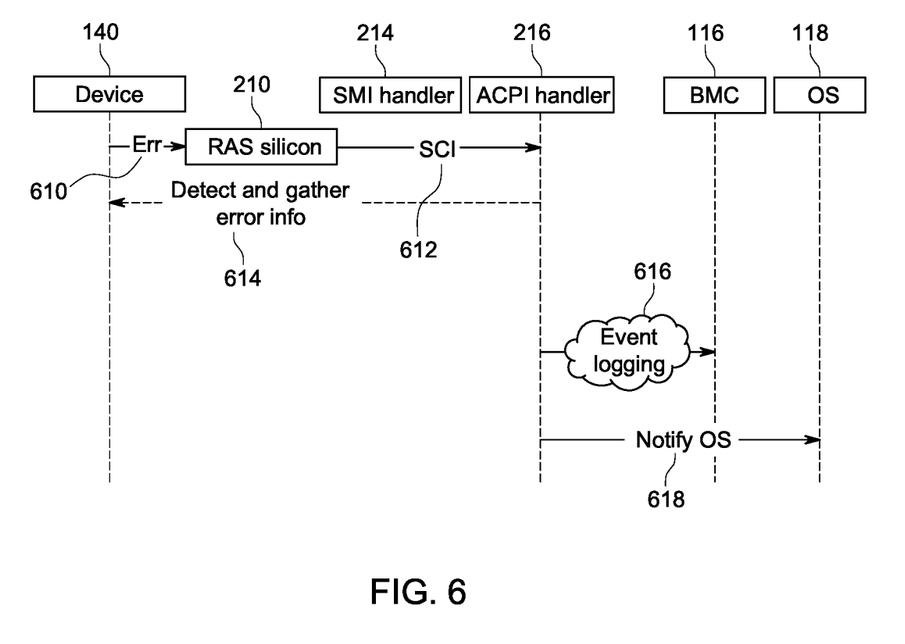
FIG. 6 is a timing diagram of an example routine that runs RAS services through the SCI handler exclusively from an in-band SCI trigger in the computer system in FIG. 2.

FIG. 6 is a timing diagram of the process of using the RAS SCI handler 216 exclusively for RAS services using an in-band interrupt trigger. FIG. 6 shows the interaction between a faulty hardware device 140, the RAS silicon 210, the RAS SCI handler 216, the BMC 116 and the operating system 118. As explained above, this example routine obviates the need for calling the RAS SMI handler 214 in FIG. 2 and therefore avoids downtime from the SMM during the process.

An error may occur in the hardware component such as the PCIe card 140 (610). This error creates an event from the RAS silicon 210. The RAS silicon 210 issues an in-band system control interrupt to the RAS SCI handler 216 (612). The RAS SCI handler 216 detects and gathers the error information from the hardware component 610 (614). The error information is stored in the ACPI memory. The SCI handler 216 then performs error logging by communicating with the BMC 116 and adding the error data to the system error log (616). The SCI handler 216 then notifies the operating system 118 of the error (618). As shown in FIG. 6, the SMI handler 214 is not initiated during this sequence. Thus, the SMM is avoided, and processing may still occur during the execution of RAS features by the SCI handler 216.

Figure 7:
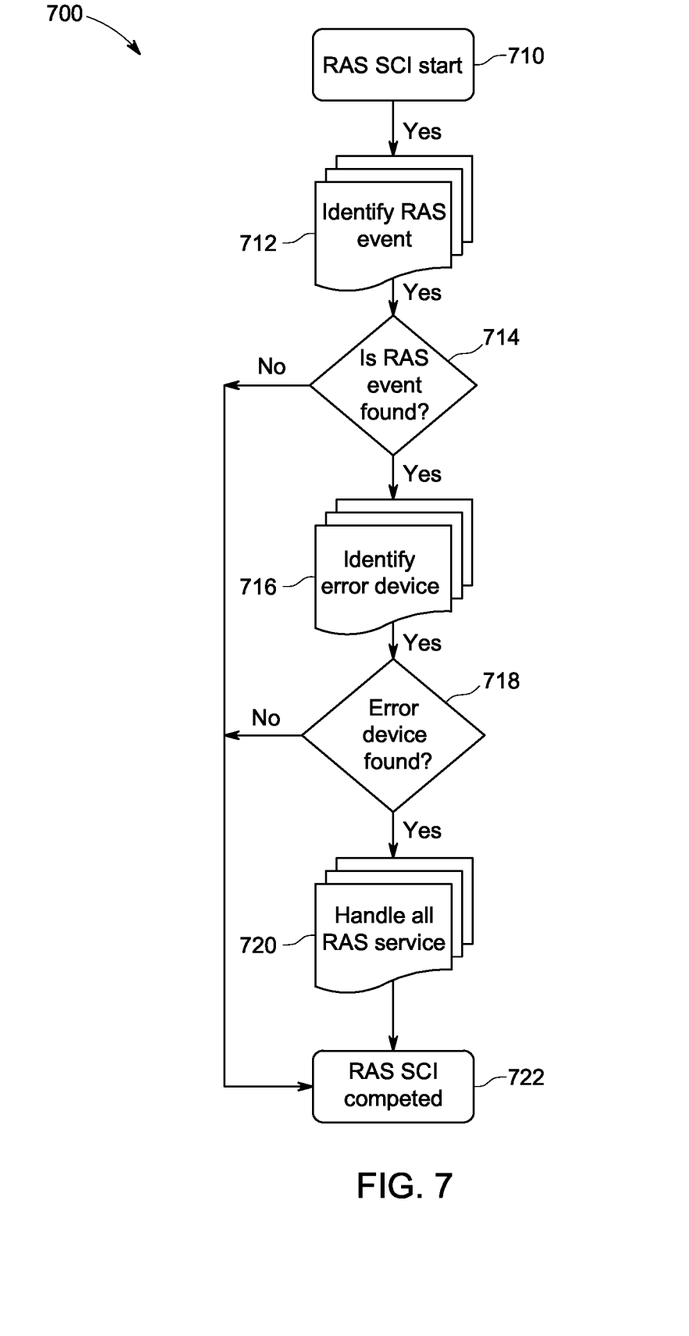
FIG. 7 is a flow diagram of an example routine for RAS with SCI only flow from an in-band SCI trigger.

FIG. 7 is a flow diagram 700 of the example routine for RAS features with the system control interrupt being initiated from an in-band SCI trigger. The RAS SCI handler 216 is started (710). The SCI handler 216 begins by identifying whether any RAS events have occurred (712). The SCI handler 216 determines whether the RAS event is found in one of the hardware devices (714). If an RAS event is found, the SCI handler 216 determines whether a hardware device having an error may be identified (716). If an error from a hardware device is found (718), the SCI handler 216 will execute all applicable RAS services including error detection and error logging in the system event log of the BMC 116. The SCI handler 216 will then complete the RAS services (720). If no RAS event is found (714) or no error device is found (718), the RAS SCI handler 216 will complete the routine (722).

Figure 8:
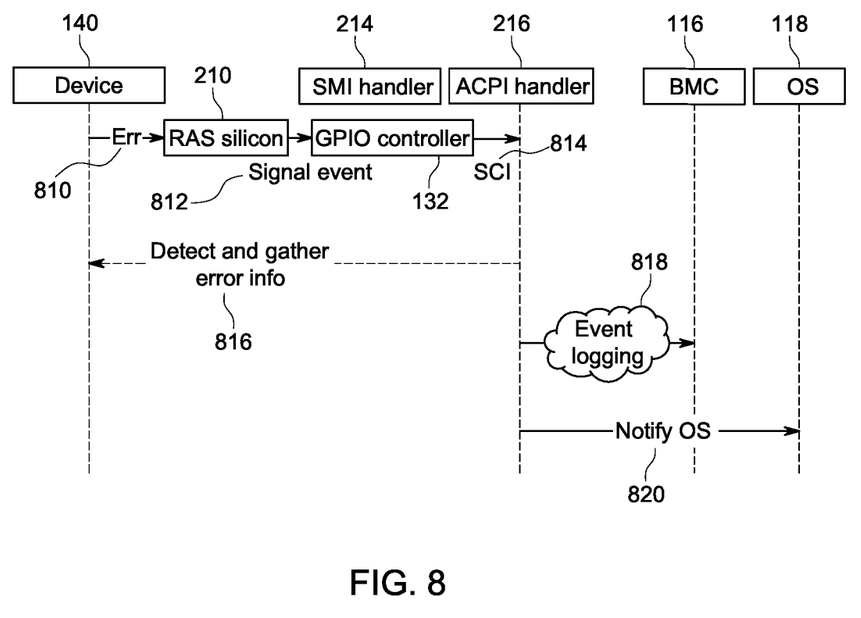
FIG. 8 is a timing diagram of an example routine that runs RAS services with a hardware pin initiation.

FIG. 8 is a timing diagram for RAS services that initiates a system control interrupt that is initiated with an SCI capable GPIO pin 134 on the south bridge chip 112 in FIG. 2. An error may occur in a hardware device such as the PCIe card 140. This error is an event determined by the RAS silicon 210 (810). The RAS silicon 210 sends a signal to the GPIO pin 134, which is received by the GPIO controller 132 in FIG. 2 (812). The GPIO controller 132 sends a system control interrupt signal to the RAS SCI handler 216 via the GPIO pin 134 in FIG. 2 (814). The RAS SCI handler 216 detects and gathers the error information from the hardware component 140 (816). The error information is stored in the ACPI memory 122. The RAS SCI handler 216 then performs error logging by communicating with the BMC 116 and adding the error to the system error log (818). The RAS SCI handler 216 then notifies the operating system 118 of the error (820). As shown in FIG. 8, the SMI handler 214 is not initiated during this sequence. Thus, the SMM is avoided, and processing may still occur during the execution of RAS features by the RAS SCI handler 216.

Figure 9:
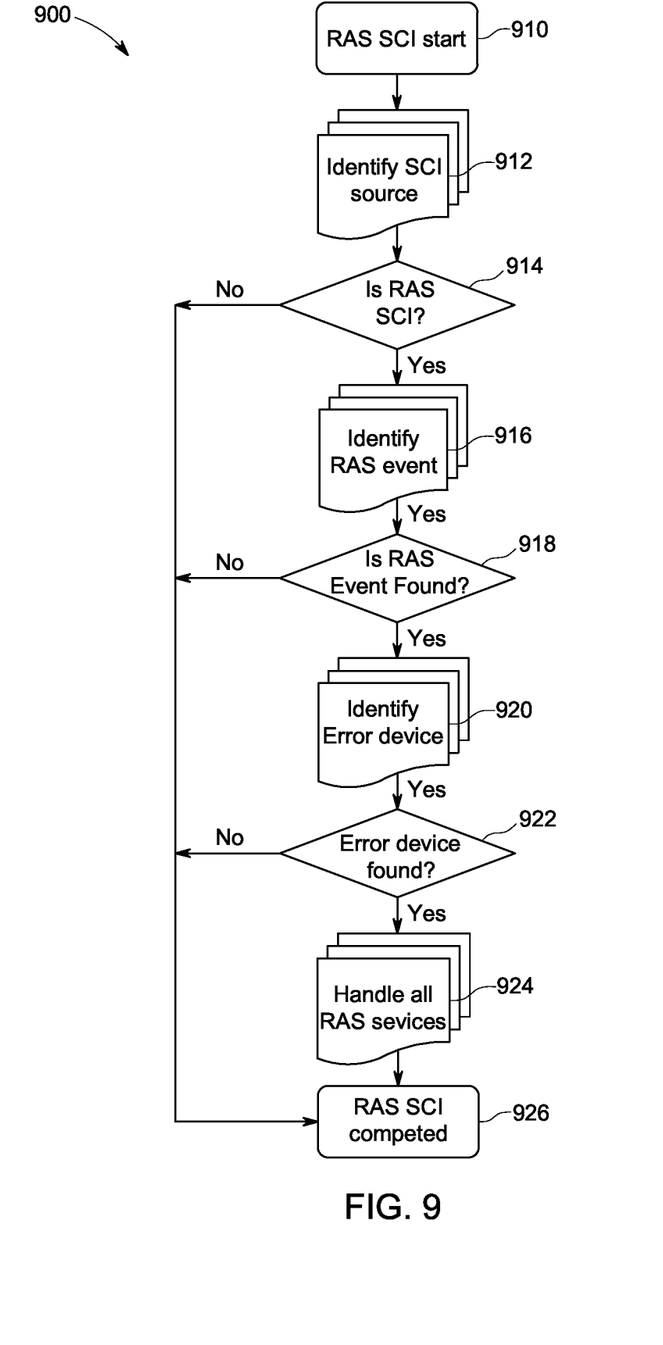
FIG. 9 is a flow diagram of the example routine for RAS with SCI only flow with an SCI capable GPIO pin trigger.

FIG. 9 is a flow diagram 900 of a routine for RAS with SCI only flow with an SCI capable GPIO pin that triggers the SCI. The RAS SCI handler 216 is started (910). The RAS SCI handler 216 begins by identifying the source of system control interrupt (912). The SCI handler 216 determines whether system control interrupt is a result from a RAS event is found (914). If the RAS SCI handler 216 determines the system control interrupt is the result of the RAS event (914), the RAS SCI handler 216 begins by identifying whether any RAS events have occurred (916). The RAS SCI handler 216 determines whether the RAS event is found (918). If an RAS event is found, the RAS SCI handler 216 determines whether a device having an error may be identified (920). If an error device is found (922), the RAS SCI handler 216 will execute all applicable RAS services including error detection and error logging in the SEL 220 of the BMC 116. The RAS SCI handler 216 will then complete the RAS services (924). If the system control interrupt is not the result of the RAS event (914), if no RAS event is found (918), or no error device is found (922), the RAS SCI handler 216 will complete the routine (926).

The flow diagrams in FIGS. 4, 5, 7, and 9 are representative of example machine readable instructions for executing some or all RAS features to the RAS SCI handler 216 of the computer system 100 in FIG. 2. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 4, 5, 7, and 9, persons of ordinary skill in the art will readily appreciate that many other methods of implementing the example machine readable instructions may alternatively be used. For example, the order of execution of the blocks may be changed, and/or some of the blocks described may be changed, eliminated, or combined.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A computer system comprising:
a basic input output system (BIOS) chip;
a processor unit having a bootstrap core executing a system management interrupt handler and a system control interrupt handler stored in the BIOS chip, and silicon for receiving error information;
a hardware component coupled to the processor unit, the hardware component sending error information to the silicon; and
a management controller including a system error log, the management controller coupled to the processor unit, wherein the bootstrap core executes the system control interrupt handler to avoid a system management mode, and wherein the system control interrupt handler logs an error of the hardware component in the system error log.

2. The system of claim 1, wherein the management controller is a baseboard management controller.

3. The system of claim 1, wherein the computer system is a server.

4. The system of claim 1, wherein the bootstrap core enters the system management mode and executes the system management mode interrupt handler to detect the error, and wherein the system management interrupt handler exits the system management mode after detecting the error.

5. The system of claim 1, wherein the hardware component is one of a peripheral component interface express (PCIe) device, a dual in line memory module, a hard disk drive, a universal serial bus device, a serial peripheral interface (SPI) device, and system management bus (SM-BUS) device.

6. The system of claim 1, wherein the processor unit includes a plurality of processor cores including the bootstrap core.

7. The system of claim 1, wherein the processor unit includes a south bridge chip including the silicon, and wherein the silicon performs reliability-availability-serviceable (RAS) features.

8. The system of claim 1, wherein the system control interrupt handler detects the error.

9. The system of claim 8, wherein the system control interrupt handler is initiated by a signal from a general purpose input output (GPIO) controller.

10. The system of claim 8, wherein the system control interrupt handler is initiated directly from the silicon triggering the system control interrupt.

11. A method of operating a computer system comprising:
receiving notification of an error in a hardware component through silicon on a processing unit;
detecting the error from the hardware component; and
logging error data of the hardware component into a system error log managed by a management controller via a system control interrupt handler executed by a processor core of the processing unit, wherein a system management mode is avoided during the logging of the error data.

12. The method of claim 11, wherein the error detection is performed via a system management interrupt handler, and wherein the computer system enters into a system management mode during the error detection and exits the system management mode when the error data is logged.

13. The method of claim 11, wherein the management controller is a baseboard management controller.

14. The method of claim 11, wherein the computer system is a server.

15. The method of claim 11, wherein the processor core is one of a plurality of processor cores operable to process threads while the error logging occurs.

16. The method of claim 11, wherein the hardware component is one of a peripheral component interface express (PCIe) device, a dual in line memory module, a hard disk drive, a universal serial bus device, a serial peripheral interface (SPI) device, and system management bus (SM-BUS) device.

17. The method of claim 11, wherein the processor unit includes a south bridge chip including the silicon, and wherein the silicon performs reliability-availability-serviceable (RAS) features.

18. The method of claim 11, wherein the error detection is performed via a system control interrupt handler executed by the processor core.

19. The method of claim 18, wherein the system control interrupt handler is initiated by a signal from a general purpose input output (GPIO) controller.

20. The method of claim 18, wherein the system control interrupt handler is initiated directly from the silicon triggering the system control interrupt.

* * * * *